United States Patent
Buoro et al.

(10) Patent No.: US 10,599,959 B2
(45) Date of Patent: Mar. 24, 2020

(54) AUTOMATIC PEST MONITORING BY COGNITIVE IMAGE RECOGNITION WITH TWO CAMERAS ON AUTONOMOUS VEHICLES

(71) Applicant: International Business Machines Corporation, Armonk, NY (US)

(72) Inventors: Alvaro Bueno Buoro, Rio de Janeiro (BR); Takashi Imamichi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/479,494

(22) Filed: Apr. 5, 2017

(65) Prior Publication Data
US 2018/0293444 A1    Oct. 11, 2018

(51) Int. Cl.
G06K 9/62    (2006.01)
G06K 9/00    (2006.01)
G06K 9/20    (2006.01)

(52) U.S. Cl.
CPC ....... G06K 9/6289 (2013.01); G06K 9/00657 (2013.01); G06K 9/20 (2013.01); *G06K 2009/00644* (2013.01)

(58) Field of Classification Search
CPC . G06K 9/00771; G06K 9/00791; G06K 9/209
See application file for complete search history.

(56) References Cited

U.S. PATENT DOCUMENTS

| 4,967,276 A | * | 10/1990 | Murakami | ............. | H04N 5/265 |
| | | | | | 250/330 |
| 5,742,335 A | * | 4/1998 | Cannon | ................ | G01M 11/081 |
| | | | | | 348/135 |
| 7,706,606 B1 | * | 4/2010 | Ruzon | ................ | H04N 1/40012 |
| | | | | | 382/162 |

(Continued)

OTHER PUBLICATIONS

Allema, A., et al., "Effect of light quality on movement of Pterostichus melanarius (Coleoptera: Carabidae)", Journal of Applied Entomology, Accepted Mar. 21, 2012, vol. 136, No. 10, pp. 1-8.

(Continued)

*Primary Examiner* — Anner N Holder
(74) *Attorney, Agent, or Firm* — Fleit Intellectual Property Law; Donna Flores (57) ABSTRACT

A computer-implemented method, an automatic pest control monitoring system and computer program product automatically monitor for pests on crops. An autonomous vehicle equipped with a normal camera and at least one alternate camera, simultaneously captures a normal image and a true alternate image containing a same portion of the crops. A composite image is generated using the difference of the captured images. If at least one pest is determined to present by applying an object recognition algorithm to the composite image, reactive measures are automatically deployed. The alternate camera may be an infrared camera or an ultraviolet camera. The composite image is generated by correlating the normal image with the true alternate image, determining the differences between the normal image and (Continued)

the true alternate image, and generating the composite image based on the differences between the normal image and the true alternate image.

16 Claims, 4 Drawing Sheets

(56) References Cited

U.S. PATENT DOCUMENTS

| | | | | |
|---|---|---|---|---|
| 8,296,056 | B2* | 10/2012 | Becker | G01C 23/00 |
| | | | | 701/408 |
| 8,422,797 | B2* | 4/2013 | Heisele | G06K 9/00208 |
| | | | | 382/159 |
| 9,382,003 | B2 | 7/2016 | Burema et al. | |
| 9,563,852 | B1 | 2/2017 | Wiles et al. | |
| 2006/0268110 | A1* | 11/2006 | Koike | G06T 5/50 |
| | | | | 348/159 |
| 2012/0042563 | A1* | 2/2012 | Anderson | G06N 5/04 |
| | | | | 43/132.1 |
| 2012/0063689 | A1* | 3/2012 | Tran | G06K 9/00281 |
| | | | | 382/224 |
| 2012/0288186 | A1* | 11/2012 | Kohli | G06K 9/6255 |
| | | | | 382/159 |
| 2013/0068892 | A1 | 3/2013 | Bin Desa et al. | |
| 2013/0156271 | A1* | 6/2013 | Cimino | G06K 9/00624 |
| | | | | 382/110 |
| 2014/0058881 | A1* | 2/2014 | Rosenbaum | G06Q 50/02 |
| | | | | 705/26.7 |
| 2016/0050840 | A1* | 2/2016 | Sauder | A01B 79/005 |
| | | | | 701/3 |
| 2016/0176542 | A1* | 6/2016 | Wilkins | A01M 27/00 |
| | | | | 348/144 |
| 2016/0249811 | A1* | 9/2016 | Khan | A61B 1/00009 |
| | | | | 600/474 |
| 2016/0260207 | A1* | 9/2016 | Fryshman | G06T 7/0008 |
| 2017/0024631 | A1* | 1/2017 | Hong | G08B 25/08 |
| 2017/0076508 | A1* | 3/2017 | VanBlon | G09G 5/006 |
| 2017/0131718 | A1* | 5/2017 | Matsumura | G05D 1/02 |
| 2017/0185276 | A1* | 6/2017 | Lee | G06F 3/04847 |
| 2017/0231213 | A1* | 8/2017 | Gordon | A01M 7/0089 |
| | | | | 43/132.1 |
| 2017/0359943 | A1* | 12/2017 | Calleija | A01B 79/005 |
| 2018/0065747 | A1* | 3/2018 | Cantrell | A01M 7/00 |
| 2018/0068164 | A1* | 3/2018 | Cantrell | G06K 9/0063 |
| 2018/0068165 | A1* | 3/2018 | Cantrell | G06K 9/0063 |
| 2018/0136332 | A1* | 5/2018 | Barfield, Jr. | G01S 17/42 |
| 2018/0144209 | A1* | 5/2018 | Kim | G16H 50/20 |

OTHER PUBLICATIONS

Mankin, R., "New Device Eavesdrops on Insect Pests", Agricultural Research, Mar. 2011, p. 22.
Youtube, "DJI Phantom 4", published on Jun. 15, 2016, https://www.youtube.com/watch?v=eg4SNmSvLis, pp. 1-3.
Youtube, "Infrared Insects", published on May 15, 2012, https://www.youtube.com/watch?v=UKJz3fDx9dw, pp. 1-3.
Wiikipedia, "Neutral-density filter", https://en.wikipedia.org/wiki/Neutral-density_filter, last visited on Dec. 16, 2016, pp. 1-5.
Wiikipedia, "Polarizing filter (photography)", https://en.wikipedia.org/wiki/Polarizing_filter_%28photography%29, last visited on Dec. 16, 2016, pp. 1-5.
Youtube, "UV Flashlight—Detect Scorpions, Bed Bugs, Pet Urine, and Body Fluids", published on Jun. 10, 2015, https://www.youtube.com/watch?v=N8n3JsdViN4, pp. 1-2.
Youtube, "OPTiM Agri Drone", published on Jun. 7, 2016, https://www.youtube.com/watch?v=9wUbiGVJ0nM&feature=youtu.be&t=33, pp. 1-2.
Freefly, "Freefly Store TERO RemoteControl Vehicle for Filmmakers", http://store.freeflysystems.com/collections/freefly-tero/products/freefly-tero, last visited on Jan. 3, 2017, pp. 1-2.

* cited by examiner

AUTOMATIC PEST MONITORING BY COGNITIVE IMAGE RECOGNITION WITH TWO CAMERAS ON AUTONOMOUS VEHICLES

BACKGROUND

The present disclosure generally relates to pest monitoring and control for crops and more particularly relates to a system and method for automatically monitoring pests using cognitive image recognition with different types of cameras on autonomous vehicles.

Pest control is an important task for agriculture to increase crop production. Monitoring plays a key role in pest control systems. Monitoring allows crop producers to identify the distribution of pests over their land and evaluate the impact of these pests on crop yield and quality. In addition, monitoring provides an ongoing pest history of the farms to improve farm management. Conventional monitoring mainly relies on traps (e.g., sticky trap, wing trap, bucket trap, pan trap, pitfall trap, light trap, etc.) or farmers sometimes capture pests themselves using vacuums or nets.

More recent methods of pest monitoring involve using drones to capture images of the plants and identify pests in the images. However, due to a variety of obstacles, such as the size and color of the plants and pests in relation to one another or the location of the pests on the plants (e.g., underside of leaves), pest identification and monitoring remains a constant challenge.

BRIEF SUMMARY

In various embodiments, a computer-implemented method, an automatic pest control monitoring system and computer program product automatically monitor for pests on crops are disclosed. The method comprises simultaneously capturing, by an autonomous vehicle equipped with a normal camera and at least one alternate camera, a normal image and a true alternate image containing a same portion of the crops. A composite image is generated using the captured images. If at least one pest is determined to present by applying an object recognition algorithm to the composite image, reactive measures are automatically deployed.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Embodiments of the present invention provide a system and associated methods to automatically monitor and control pests, such as insects or rodents, in agricultural/farming environments using an autonomous vehicle equipped with a Global Positioning System (GPS) receiver, a light and two different types of cameras. The vehicle can endure earth terrains and travels over a predefined track or route (e.g., corn rows in a field), simultaneously capturing photographs of the crops using both a normal camera and an alternate camera. Using the photographs captured by both cameras, a composite image is created which permits more accurate object recognition results to determine a more precise location and extent of a pest infestation quickly, allowing reactive measures to be taken at an earlier stage to contain and prevent widespread crop devastation. Reactive measures may include the autonomous vehicle immediately releasing traps and/or "on the spot" pesticides to mitigate damages caused by pests.

Operating Environment

Figure 1:
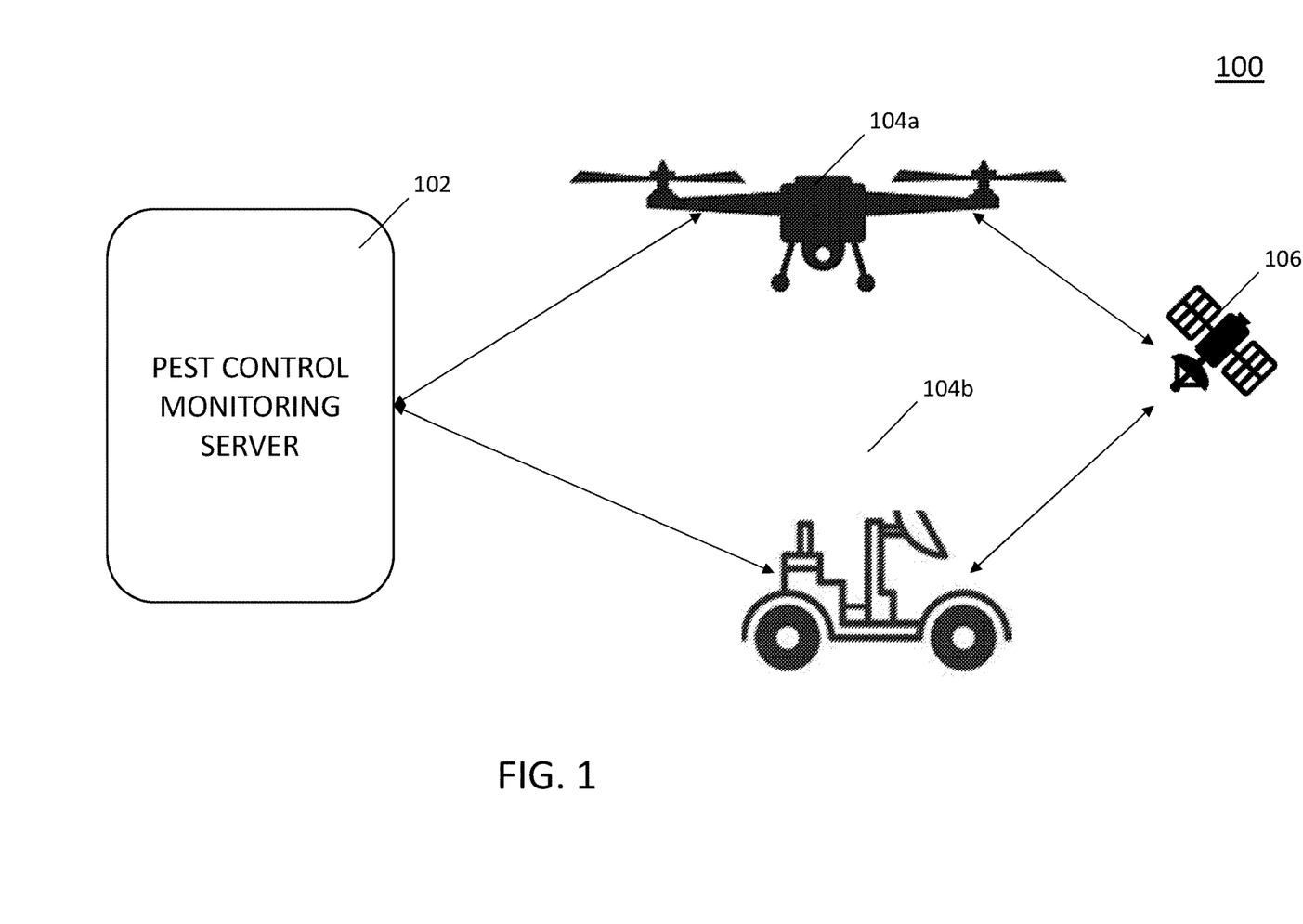
FIG. 1 is a block diagram illustrating one example of an operating environment comprising an automatic pest control monitoring system using cognitive image recognition according to one embodiment of the present invention.

Turning now to FIG. 1, a block diagram of one example of an operating environment comprising an automatic pest control monitoring system 100 using cognitive image recognition according to one embodiment of the present invention. The system 100 includes a pest control monitoring server 102 in wireless communication with at least one autonomous vehicle such as a remotely controlled flying drone 104a, a land roving vehicle 104b, and the like. Flying drone 104a and land roving vehicle 104b are referenced generally herein as "autonomous vehicle 104." Although FIG. 1 depicts one flying drone 104a and one land roving vehicle 104b, it should be noted that system 100 may contain any number of autonomous vehicles 104 in any configuration.

Pest control monitoring server 102 communicates wirelessly with autonomous vehicle 104 using any wireless communication protocol, such as cellular protocols (e.g., Long-Term Evolution (LTE), Global System for Mobile Communications (GSM), Enhanced Data rates for GSM Evolution (EDGE), etc.), or short-range communication protocols such as that described by the IEEE 802.11 standard (i.e. Wi-Fi), Bluetooth, etc. It should be noted that the means of communication with the autonomous vehicle 104 is not limited to the above example communication protocols and may include any protocol that provides wireless communication. The pest control monitoring server 102 may provide instructions to direct the course, movement or speed of the autonomous vehicle 102 or the autonomous vehicle may be controlled via another wireless controller (not shown). Alternatively, the autonomous vehicle 104 may be pre-programmed to traverse a given path or route without receiving control feedback or input from the pest control monitoring server 102.

In addition, the autonomous vehicle 104 may be in communication with a Global Positioning System (GPS) satellite 106 to determine the exact location (i.e. latitude and longitude) of the autonomous vehicle 104 at any given time. The autonomous vehicle 104 may send pest information (such as notification and identification of a pest outbreak, extent of infestation, number of pests identified, location of pest outbreak, actions deployed to combat outbreak, evidence of pest outbreak, etc.) to the pest control monitoring server 102 as the autonomous vehicle 104 traverses its route.

Figure 2:
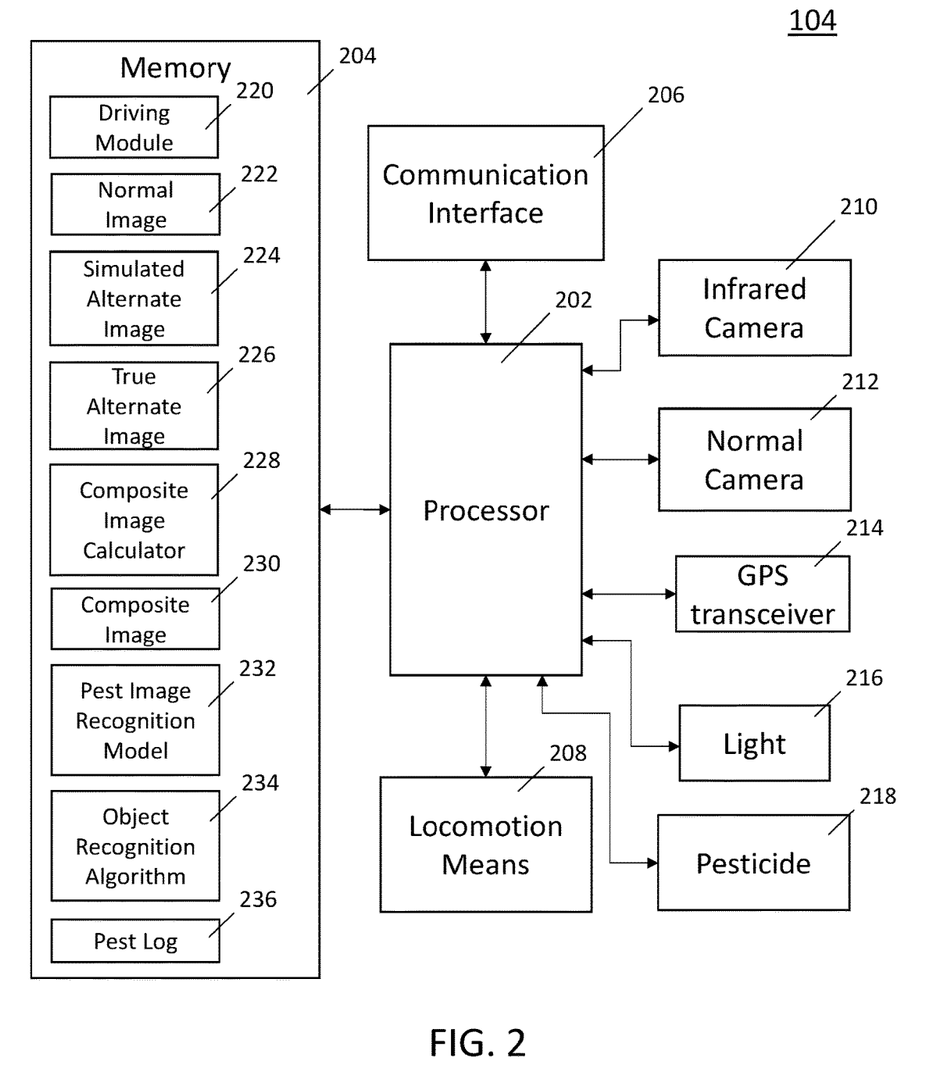
FIG. 2 is a block diagram of one example of an autonomous vehicle for automatic pest control monitoring according to one embodiment of the present invention.

FIG. 2 depicts a block diagram of an example autonomous vehicle 104 in accordance with the present invention. Autonomous vehicle 104 includes a processor 202 electrically coupled with a memory 204 and a communication interface 206. The autonomous vehicle 104 communicates with pest control monitoring server 102 and any other remote controllers via the communication interface. Processor 202 is further electrically coupled to a variety of accessories including a locomotion means 208, at least one alternate camera 210, a normal camera 212, a GPS transceiver 214, a light 216 and a pesticide container 218. The normal camera 212 captures images using the visible light frequency range. The alternate camera 210 may be an infrared camera, an ultraviolet camera, or some other type of camera different from a "normal" camera 212, that captures images or visual representations of images using frequencies outside of the visible light spectrum. It should be noted that the accessories shown is not an exhaustive listing and may include other features.

The memory 204 contains program files and data files for use with the automatic pest control monitoring system 100, such as driving module 220, normal image 222, simulated alternate image 224, true alternate image 226, composite image calculator 228, composite image 230, pest image recognition model 232, object recognition algorithm 234 and pest log 236. Normal images 222 are captured using a normal camera 212 and true alternate images 224 are captured correlating to the same or similar viewpoint as the normal image 222 using the alternate camera 210. The selection of alternate camera 210 type may be dependent upon the type of pest and/or specific type of crop that the automatic pest control monitoring system 100 is observing. A simulated infrared alternate image 226 (e.g., a "fake" infrared image) is obtained, for example, by generating a greyscale image from the normal image 222. Other known procedures for generating a simulated alternate image 226 from a normal image 222 may be used, but the details of the conversion process are outside the scope of this invention. A composite image calculator 228 creates a composite image 230 by finding the differences between the true alternate image 224 and the simulated alternate image 226 using methods which will be described in further detail below. An object recognition algorithm 232 uses the pest image recognition model 234 to determine whether any pests are located on or near the crops and the results are stored in pest log 236.

Although FIG. 2 shows the simulated alternate image 224, composite image calculator 228, composite image 230, pest image recognition model 232, and object recognition algorithm 234 as being stored on the autonomous vehicle 104, such that the processing of the images and object recognition is performed locally at the autonomous vehicle, some or all of these items could additionally or alternatively be stored on the pest control monitoring server 102 as the pest control monitoring server 102 may have greater computational and storage abilities. In that case, the autonomous vehicle 104 sends the normal image 222 and the true alternate image 226 to the pest control monitoring server 102 for analysis and the pest control monitoring server 102 returns results to the autonomous vehicle 104 for recording in the pest log 236 and taking any reactive measures.

The locomotion means 208 may be any means that allows for guided movement of the autonomous vehicle 104. For example, in land roving vehicle 104b, the locomotion means 208 may include an engine connected to a steering system and wheels for traversing over land. In flying drone 104a, the locomotion means 208 may include an engine connected to a propeller and rudder system. The processor 202 controls the movement of the autonomous vehicle 104 using software stored in memory 204 as driving module 220.

The light 216 is used to allow for navigation and/or normal image capturing in non-ideal conditions (e.g., nighttime, cloudy weather, etc.). Light may also be used to provide ultraviolet flash as an alternative to infrared.

When the automatic pest control monitoring system 100 positively identifies a pest infestation, the system 100 may deploy reactive measures to prevent crop damage, such as sending notifications of infestation to an authorized party, sounding alerts, automatically releasing pesticides, etc. Small quantities of pesticide may be carried in the pesticide container 218 for spot issues; however, larger pesticide distribution systems (not shown) covering most or all of the crop acreage may be connected to or in communication with the automatic pest control monitoring system 100 and may be activated upon a positive identification.

Figure 3:
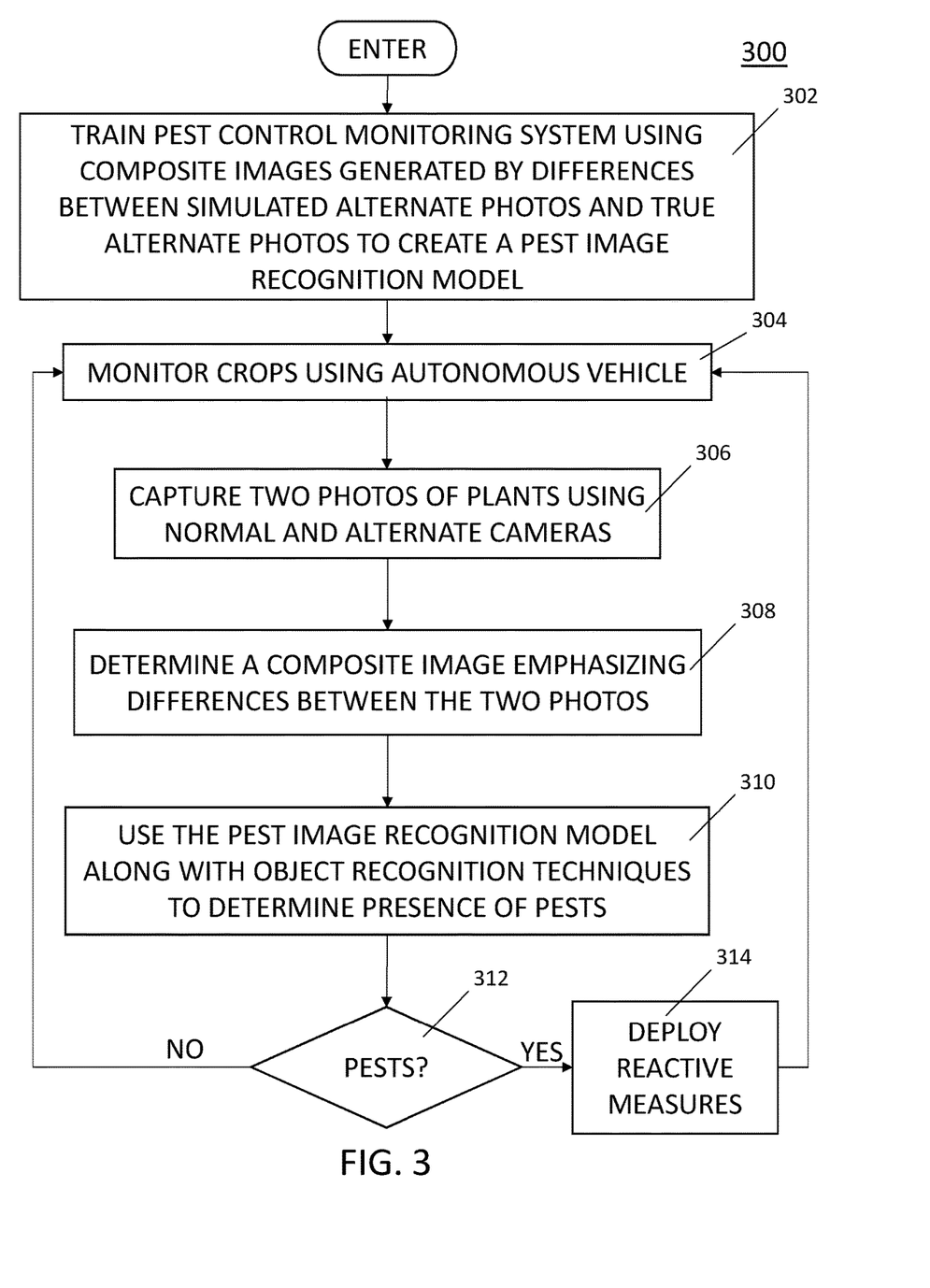
FIG. 3 is an operational flow diagram illustrating one process of automatically monitoring for the presence of pests using cognitive image recognition with two cameras on an autonomous vehicle according to one embodiment of the present invention.

Exemplary steps for operating an automatic pest control monitoring system 100 using cognitive image recognition will be described with reference to FIG. 3. FIG. 3 depicts an operational flowchart 300 for performing an exemplary process according to one embodiment of the present invention. At step 302, the automatic pest control monitoring system 100 is trained to recognize known pests or evidence of pests (e.g., footprints, droppings, damage or breakage of plants, etc.). Using composite images 230 created from determining the differences between pairs of images consisting of a simultaneously captured true alternate image 226 and simulated alternate image 224 captured by the autonomous vehicle 104 or retrieved from a known database, a user with knowledge of known pests (e.g., farmer, entomologist, etc.) specifies the presence or absence of insects, other pests, or evidence of other pests by reviewing the composite images. The user may also identify (i.e. name) the pests during the training phase. It should be noted that even a trained human eye may have difficulty identifying some pests as the pests may tend to blend into the surrounding environment and be camouflaged to the naked eye. As a result of the training, a pest image recognition model is created for use during the monitoring phase of operation to identify pests.

At step 304, the autonomous vehicle 104 monitors crops in the coverage area by following a predetermined route. As the autonomous vehicle 104 may be able to get lower to the ground than a person usually does, the vehicle 104 has a better view in monitoring such areas of the plants as the underside of leaves where insects may also live. At step 306, the autonomous vehicle 104 simultaneously captures a pair of images: a normal image 222 from the normal camera 212 and a true alternate image 226 from the infrared camera 210. Although pests are usually difficult to recognize using only a normal camera image, it is easier to identify the pests using an infrared camera because pests tend to have different temperature patterns than the surrounding environment.

The natural coloring of an insect often matches the surrounding leaves almost perfectly, providing camouflage to the insect and making detection difficult with the naked eye or in a normal color photograph. However, the contrast between the insect body and the surrounding environment is noticeably stronger in the true alternate image 226 captured using the alternate camera 210, making identification a bit easier. In actual practice, the normal image 222 and the true alternate image 226 are correlated to line up such that the images substantially overlap perfectly. However, there is still a tendency for the insect body to blend in with the surrounding environment.

At step 308, a composite image 230 is generated which emphasizes the insect body in relation to the surrounding environment (i.e. the contrast between the insect body and the surrounding environment is much greater). The composite image 230 is generated by first converting the normal image 222 which is captured in color, to a corresponding simulated alternate image 224 by converting the color pixels to greyscale or by other known methods. Each pixel of the greyscale image (i.e. simulated alternate image 224) has a corresponding greyscale value. Likewise, each pixel of the true alternate image 226 also has a greyscale value. The composite image 230 is created by displaying the difference of the greyscale values of the corresponding pixels in both the simulated alternate image 224 and the true alternate image 226 on a pixel-by-pixel basis.

At step 310, the trained pest image recognition model 232 is used with known object recognition techniques to determine the presence of pests. Optionally, the pest image recognition model 232 may be updated on the fly using results of the monitoring phase. If the automatic pest control monitoring system 100 determines that pests are present, at step 312, reactive measures may be deployed at step 314. As mentioned above, the reactive measures may include notifying an authority of the presence of pests, sounding an alert, or releasing pesticides, traps or other deterrents from the autonomous vehicle 104. If no pests are found, at step 312, the automatic pest control monitoring system 100 continues monitoring activities for a predetermined period of time, until the autonomous vehicle 104 reaches an endpoint of a predetermined route, or the system 100 is manually stopped.

Automatic Pest Monitoring Server

Figure 4:
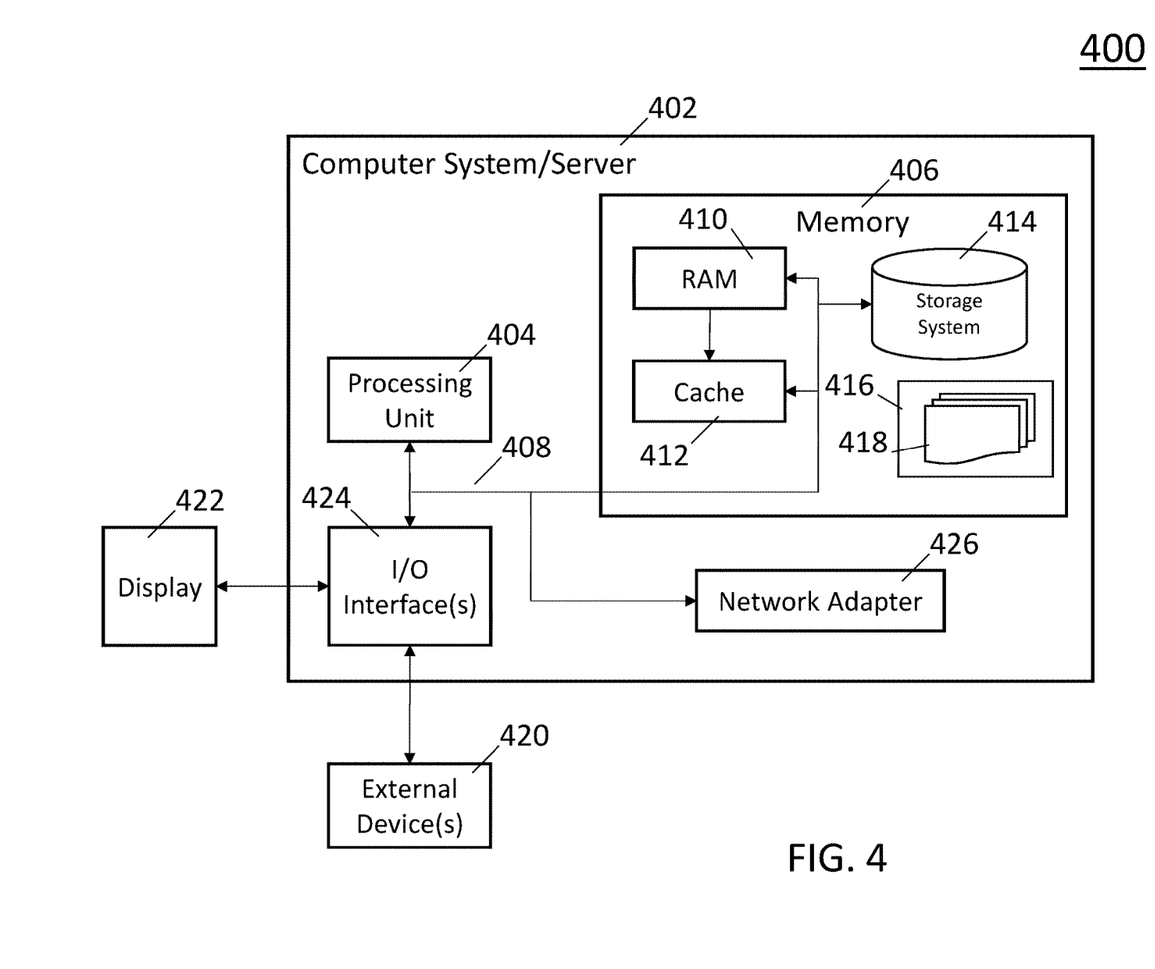
FIG. 4 is a block diagram of an automatic pest monitoring server according to one embodiment of the present invention.

Referring now to FIG. 4, a block diagram illustrating an information processing system 400 that can be utilized in embodiments of the present invention is shown. The information processing system 402 is based upon a suitably configured processing system configured to implement one or more embodiments of the present disclosure (e.g., pest control monitoring server 102). Any suitably configured processing system can be used as the information processing system 402 in embodiments of the present invention. The components of the information processing system 402 can include, but are not limited to, one or more processors or processing units 404, a system memory 406, and a bus 408 that couples various system components including the system memory 406 to the processor 404.

The bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 4, the main memory 406 may include normal image 222, simulated alternate image 224, true alternate image 226, composite image calculator 228, composite image 230, pest image recognition model 232 and object recognition algorithm 234 shown in FIG. 2. One or more of these components can reside within the processor 404, or be a separate hardware component. The system memory 406 can also include computer system readable media in the form of volatile memory, such as random access memory (RAM) 410 and/or cache memory 412. The information processing system 402 can further include other removable/non-removable, volatile/non-volatile computer system storage media. By way of example only, a storage system 414 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 408 by one or more data media interfaces. The memory 406 can include at least one program product having a set of program modules that are configured to carry out the functions of an embodiment of the present disclosure.

Program/utility 416, having a set of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of embodiments of the present disclosure.

The information processing system 402 can also communicate with one or more external devices 420 (such as a keyboard, a pointing device, a display 422, etc.); one or more devices that enable a user to interact with the information processing system 402; and/or any devices (e.g., network card, modem, etc.) that enable computer system/server 402 to communicate with one or more other computing devices. Such communication can occur via I/O interfaces 424. Still yet, the information processing system 402 can communicate with one or more networks such as a local area network (LAN), a general wide area network (WAN), and/or a public network (e.g., the Internet) via network adapter 426. As depicted, the network adapter 426 communicates with the other components of information processing system 402 via the bus 408. Other hardware and/or software components can also be used in conjunction with the information processing system 702. Examples include, but are not limited to: microcode, device drivers, redundant processing units, external disk drive arrays, RAID systems, tape drives, and data archival storage systems.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for automatically monitoring for pests on crops, the method comprising:
   simultaneously capturing, by an autonomous vehicle equipped with a normal camera and at least one alternate camera, a normal image and a true alternate image containing a same portion of the crops;
   generating a composite image using the captured images by
      correlating the normal image with the true alternate image;
      determining differences between the normal image and the true alternate image; and
      generating the composite image based on the differences between the normal image and the true alternate image;
   training an object recognition algorithm to create a pest image recognition model;
   determining whether at least one pest is present by applying the object recognition algorithm to the composite image using the pest image recognition model to identify the location of pests in the composite image; and
   responsive to determining that at least one pest is present, automatically deploying reactive measures.

2. The method of claim 1, wherein the autonomous vehicle is selected from the group consisting of a flying drone and a land roving vehicle.

3. The method of claim 1, wherein the at least one alternate camera is selected from a group consisting of an infrared camera and an ultraviolet camera.

4. The method of claim 1, wherein the normal image is a color photograph, said generating a composite image further comprises:
   converting the color photograph to a simulated alternate image;
   correlating the simulated alternate image with the true alternate image;
   determining differences between the simulated alternate image and the true alternate image; and
   generating the composite image based on the differences between the simulated alternate image and the true alternate image.

5. The method of claim 4, wherein said converting the color photograph to a simulated alternate image comprises converting the color photograph to a corresponding greyscale image.

6. The method of claim 5, wherein the simulated alternate image and the true alternate image are comprised of pixels, each pixel having a numeric greyscale value, said determining differences between the simulated alternate image and the true alternate image comprises:
   subtracting numeric greyscale values of corresponding pixels in the simulated alternate image and the true alternate image, on a pixel-by-pixel basis, to find a difference value for each pixel; and
   storing the difference value for each pixel to create the composite image.

7. The method of claim 1, wherein said automatically deploying reactive measures comprises the autonomous vehicle performing an action selected from the group consisting of: sending notifications to an authorized party, sounding alerts, and releasing pesticides.

8. The method of claim 1, wherein the notifications include global positioning system (GPS) coordinates identifying a location of the places where at least one pest was identified.

9. An automatic pest control monitoring system comprising:
   a pest control monitoring server; and
   at least one autonomous vehicle in communication with the pest control monitoring server, the autonomous vehicle comprising:
      a memory storing computer instructions;
      a communication interface;
      at least on alternate camera;
      a normal camera; and
      a processor, operably coupled with the memory, the communication interface, the infrared camera and the normal camera, which:
      simultaneously captures a normal image and a true alternate image containing the same portion of a crop;
      generates a composite image using the captured images by:
         correlating the normal image with the true alternate image;
         determining differences between the normal image and the true alternate image; and
         generating the composite image based on the differences between the normal image and the true alternate image;
      trains an object recognition algorithm to create a pest image recognition model;
      determines whether at least one pest is present by applying an object recognition algorithm to the composite image using the pest image recognition model to identify the location of pests in the composite image; and
      responsive to determining that at least one pest is present, automatically deploys reactive measures.

10. The automatic pest control monitoring system of claim 9, wherein the at least one alternate camera is selected from the group consisting of an infrared camera and an ultraviolet camera.

11. The automatic pest control monitoring system of claim 9, wherein the normal image is a color photograph, the processor generates a composite image by further:
   converting the color photograph to a simulated alternate image;
   correlating the simulated alternate image with the true alternate image;
   determining differences between the simulated alternate image and the true alternate image; and
   generating the composite image based on the differences between the simulated alternate image and the true alternate image.

12. The automatic pest control monitoring system of claim 11, wherein said converting the color photograph to a simulated alternate image comprises converting the color photograph to a corresponding greyscale image.

13. The automatic pest control monitoring system of claim 12, wherein the simulated alternate image and the true alternate image are comprised of pixels, each pixel having a numeric greyscale value, the processor determines differences between the simulated alternate image and the true alternate image by:
- subtracting numeric greyscale values of corresponding pixels in the simulated alternate image and the true alternate image, on a pixel-by-pixel basis, to find a difference value for each pixel; and
- storing the difference value for each pixel to create the composite image.

14. The automatic pest control monitoring system of claim 9, wherein said reactive measures comprises actions selected from the group consisting of: sending notifications to an authorized party, sounding alerts, and releasing pesticides.

15. The automatic pest control monitoring system of claim 14, wherein the notifications include global positioning system (GPS) coordinates identifying a location of the at least one pest.

16. A computer program product for automatically monitoring for pests on crops, the computer program product comprising:
- a non-transitory storage medium, readable by a processing circuit and storing instructions for execution by the processing circuit for performing a method comprising:
  - generating a composite image using a normal image and a true alternate image containing a same portion of the crops, the images simultaneously captured by an autonomous vehicle equipped with a normal camera and at least one alternate camera, by:
    - correlating the normal image with the true alternate image;
    - determining differences between the normal image and the true alternate image; and
    - generating the composite image based on the differences between the normal image and the true alternate image;
  - training an object recognition algorithm to create a pest image recognition model;
  - determining whether at least one pest is present by applying an object recognition algorithm to the composite image using the pest image recognition model to identify the location of pests in the composite image; and
  - responsive to determining that at least one pest is present, automatically deploying reactive measures.

* * * * *